Dec. 29, 1970  K. M. PICKLES ET AL  3,550,266
METHOD OF PRODUCING CORES
Filed April 12, 1968
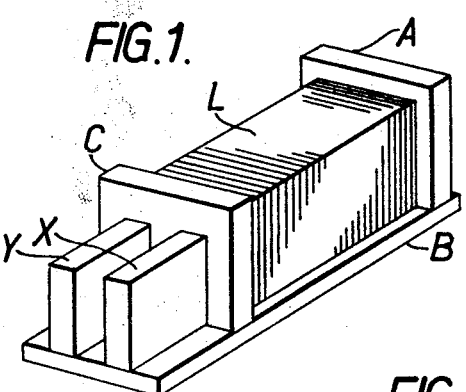
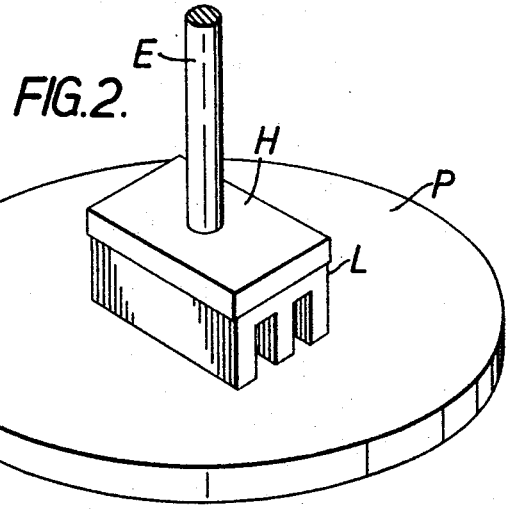
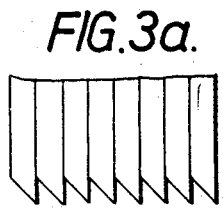
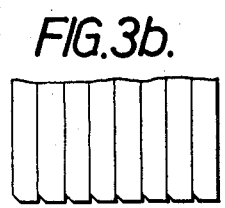
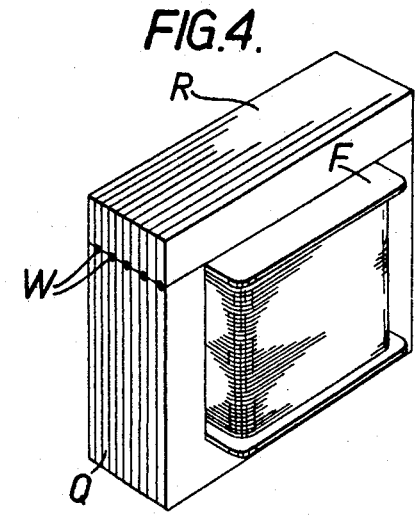

United States Patent Office 3,550,266
Patented Dec. 29, 1970

3,550,266
METHOD OF PRODUCING CORES
Kathleen M. Pickles, Purton, Harry Hirst, Wootton Bassett, and William G. French, Swindon, England, assignors to Linton and Hirst Limited
Filed Apr. 12, 1968, Ser. No. 720,873
Claims priority, application Great Britain, Apr. 20, 1967, 18,317/67; Sept. 19, 1967, 42,689/67
Int. Cl. H01f 7/06
U.S. Cl. 29—609                         1 Claim

ABSTRACT OF THE DISCLOSURE

A method of manufacturing laminated cores for transformers and chokes comprising securing together stacks of laminae, produced by securing a plurality of identical laminae together by coating the edges of the laminae forming some of the side faces of the stack with an adhesive, by spot welding between opposite laminae in the stacks so that adjacent laminae in the stacks remain electrically insulated from one another.

---

The present invention relates to a method of producing cores for transformers and chokes, said cores being of the kind which are composed of laminae of iron or an iron alloy, wherein each lamina is insulated from adjacent laminae to prevent the circulation of eddy currents and the laminae are introduced into a former wound with a number of turns of an electrical conductor. The cores are composed of two sets of these laminae, each set of laminae having a cross-section which forms an open geometrical figure, said sets of laminae co-operating to form a closed figure, for instance, one set of laminae being of U-shaped cross-section, with the conductor encircling one or both limbs, the open end of the U being closed by another set of laminae having an I-shaped or U-shaped cross-section; two sets of laminae both of which are of F-shaped cross-section with the conductors encircling the shorter limbs and the ends of the longer limbs being in contact; and one set of laminae of E-shaped cross-section, with the conductor encircling the centre limb of the E and another set of laminae of I-shaped cross-section closing the figure.

Core assemblies as described hereinbefore are known wherein the successive layers of laminae face in opposite directions so that the interruptions between co-operating laminae of each layer do not coincide. This staggered construction is used to reduce the rise in magnetising current due to the interruptions in the core.

Various methods of producing pre-assembled packs are known, for example, introducing between the laminae a synthetic resin which is hardened by subsequent thermal treatment. This treatment gives rise to compressive and tensile stresses within the bonded core assembly due to the different thermal expansion rates of iron and synthetic resin. These stresses create undesirable changes in the magnetic properties of the core. The fixing together of laminae into a stack by welding or rivetting gives rise to large circulating currents within the core, which are detrimental to its function in the transformer or choke. It is often difficult to maintain a welded or rivetted core substantially rectangular in shape, with the result that the mating faces do not meet accurately enough to minimise stray flux and keep the magnetising current low. Moreover, the fact that all the gaps coincide instead of being staggered exaggerates these undesirable effects. The mating faces may be made to match by grinding, but grinding has in the past caused a deterioration in the magnetic properties of the core. These properties may, in the case of welded or rivetted cores, be restored by annealing but the annealing causes sufficient distortion to spoil the match achieved by grinding and is often detrimental to interlaminar insulation.

It is an object of the present invention to provide a method of producing cores which obviates or mitigates the necessity both for staggering the interruptions between co-operating laminae and for the assembly of the laminae one by one into the conductive winding.

According to the invention, there is provided a method of producing a length of laminae for a core of the kind referred to, comprising the steps of aligning a plurality of identical laminae in contiguous face-to-face relationship on a former, coating the edges of the laminae forming at least one side face of the length with an adhesive, and allowing the adhesive to set so that the laminae are secured together.

Preferably the edges of the laminae forming a further side face of the length are smoothed so that the smoothed face can make electrical contact with a corresponding smooth face of a further length of laminae.

From another aspect the invention provides a method of making a core of the kind referred to, having stacks of laminae produced by the method referred to above, comprising bringing the corresponding faces of two stacks of laminae together, with the laminae in one stack aligned with corresponding laminae in the other stack, and securing the stacks together.

Advantageously the two stacks of laminae are secured together by a metal fusion process between opposite laminae in the stacks, so that adjacent laminae in the stacks remain electrically insulated from one another.

The metal fusion process may for example be welding, brazing or soldering, and is preferably spot-welding.

Thus for example the outermost laminae at both ends of one stack may be secured to the outermost laminae at the ends of the other stack, the joining being effected between the unexposed faces of the respective outermost laminae.

The present invention also comprises a core when produced by the method according to the present invention.

This method of producing cores is particularly suitable for pairs of laminae having the following cross-section: EI, EE, FF, UU, UI and LL.

An embodiment of the invention will now be described, by way of example, with reference to the accompanying drawings in which:

FIG. 1 is a perspective view of a former;

FIG. 2 is a perspective view of grinding apparatus;

FIG. 3a is a fragmentary side elevation of a block of laminae;

FIG. 3b is a view similar to FIG. 3a of a block of laminae, and

FIG. 4 is a perspective view of a laminated core.

Referring to FIG. 1 there is shown a former comprising a base plate B having mounted thereon a fixed plate A and two fixed guide strips X and Y respectively. A, X and Y are at right angles to B and A is at right angles to X and Y. Strips X and Y are parallel to each other. C is an E-shaped plate which is free to slide along X and Y and which can be drawn towards A by two adjusting screws (not shown). A stack of E-shaped laminae, L, is placed between plates A and C and tapped into place so that every lamina makes contact with base plate B. Plate C is then drawn towards plate B by means of the two adjusting screws until all the laminae are in contact with each other over the whole of their face area. The three exposed side faces of the laminae are then coated with a suitable grade of epoxy resin, for example, that known as C.I.B.A. Resin MY.753. The entire assembly is then loaded onto a moving belt and is passed through an oven preheated at 400° C. for approximately 20 mins. On emerging from the oven, the adjusting screws are slackened and the solidified block of laminae, L, is picked up by an electromagnet H mounted on the end of an hydraulic ram, (FIG. 2) and passed across a circular rotating lapping table, P. The time taken for this operation and the pressure applied are arranged to be sufficient to shave off the stamping burr from the edges of the laminae (FIG. 3a). The result is shown diagrammatically in FIG. 3b. The ends of the laminae have not been ground down into an absolutely smooth, flat, mirror-like surface, but they align to such a degree that, when placed against a similar set, an electrical and magnetic contact of at least 80% of the surface is achieved. It is a feature of this type of bonded stack that any set of E laminae, for instance, will mate with any set of I laminae of the appropriate size and the stacks do not have to be kept in pairs as is the case, for instance, with wound cut cores of the C type.

After completion the operation shown in FIG. 2, the stacks pass to electrical testing apparatus in which complementary sets of laminae are placed together in a wound former and an impedance test determines whether the mating faces are making satisfactory contact.

FIG. 4 is a perspective view of two complementary sets of laminae, R, Q, assembled into a former, F. R and Q are joined together with a series of small spot welds, W. Each spot weld joins together only one pair of laminae and no spot weld is in contact with another spot weld. Therefore these welds do not give rise to any circulating currents in the core, as would be the case with the ordinary type of welded joint. It has been proved, however, that this method is quite sufficient to hold the core together under operating conditions. Alternatively, the outermost lamina at each end of one stack can be secured to the outermost lamina at each end of the corresponding stack, the joining being effected between the exposed faces of the respective outermost laminae. If required the core can be further secured by wrapping round it a piece of paper impregnated with a synthetic resin of the grade My.750 in the semi-cured condition with hardeners of the kind known as DDM/DDS and securing it temporarily with a piece of adhesive tape. If the assembly is then raised to a temperature of about 200° C. for 20 minutes (as will happen in any case if the transformer is to be impregnated), the resin in the paper will first soften and adhere to the core, and then set as a hard thin shell around its perimeter.

If cores of the type heretofore described are intended for use in a choke or transformer which is to have a gapped core (for instance, when superimposed D.C. is present in the conductor windings), the operation shown in FIG. 2 is omitted. The two parts of the core may then be secured together by putting between them a piece of paper of the appropriate thickness impregnated with synthetic resin of the grade My.750 in the "semi-cured condition", temporarily securing them, for example, with a piece of twisted wire and raising the temperature of the assembly to 200° C. for 20 mins. to cure the resin. This method is also useful for securing fixing lugs or feet to the completed core and can be combined with the method described for reinforcing the series of small spot welds shown in FIG. 4.

We claim:
1. A method of producing a core for an inductor, the core being composed of a plurality of abutting sets of laminae of annealed iron or an iron alloy, the laminae in each set being insulated one from the other, comprising the steps of aligning a plurality of identical laminae in contiguous face-to-face relationship to form a set, securing the laminae of a set together by a coating of adhesive applied to at least one of the edges thereof, repeating these steps to form a second complementary set of laminae, lapping the edges of the laminae to form further side faces of the two sets of laminae, bringing the smoothed faces produced by lapping into surface to surface engagement with one another with the laminae in one set aligned with the corresponding laminae in the other set, and securing the two sets of laminae together by welding across the joints between opposite laminae in the sets at separated positions along the edges thereof, so that adjacent laminae in the sets remain electrically insulated from one another.

References Cited
UNITED STATES PATENTS

| | | | |
|---|---|---|---|
| 1,834,898 | 12/1931 | Boyajian | 29—609X |
| 2,055,175 | 9/1936 | Franz | 29—606 |
| 2,280,981 | 4/1942 | Schuh | 29—609X |
| 2,479,302 | 8/1949 | Bondley | 29—609X |
| 2,541,502 | 2/1951 | Cross et al. | 29—609X |
| 2,930,997 | 3/1960 | Fisher et al. | 336—212X |
| 3,341,939 | 9/1967 | Feinberg et al. | 29—609X |

OTHER REFERENCES

Stack: abstract of Ser. No. 131,029, filed Dec. 3, 1949, published in volume 653 O.G., p. 860 on Dec. 18, 1951.

JOHN F. CAMPBELL, Primary Examiner

C. E. HALL, Assistant Examiner

U.S. Cl. X.R.

29—602; 336—212, 234